March 11, 1941.                I. WOLFF                2,234,329
DISTANCE DETERMINING DEVICE
Filed Sept. 29, 1939

Inventor
Irving Wolff
Attorney

Patented Mar. 11, 1941

2,234,329

UNITED STATES PATENT OFFICE 2,234,329

DISTANCE DETERMINING DEVICE

Irving Wolff, Merchantville, N. J., assignor to Radio Corporation of America, a corporation of Delaware Application September 29, 1939, Serial No. 297,093

19 Claims. (Cl. 250—1)

This invention relates to a distance determining device and more especially to an instrument for measuring the altitude of clouds, fog, or the like.

The operation of aircraft is facilitated by information as to the "ceiling" or altitude of clouds or fog which might have an influence on the navigation of the craft. During daylight hours, the ceiling is indicated by observing the time required for a balloon ascending at a known rate to disappear into the cloud layer. Such observations are not very accurate and do not provide continuous or automatic indications. During night hours, the ceiling is determined by calculating the altitude from data obtained by projecting a light beam at a predetermined angle or from a predetermined base line and observing the reflection of the beam.

According to one of the objects of the present invention the ceiling is to be indicated by projecting a modulated light beam, receiving the beam after reflection from the ceiling, and indicating or recording the distance to the ceiling as a function of the phase displacement of the modulation of the received reflected beam. Another object is to provide means for indicating the distance of a light reflecting object by means of main and vernier indications to measure said distance with the desired accuracy. An additional object is to provide means for indicating continuously and accurately the altitude of a light reflecting cloud layer.

Figure 1:
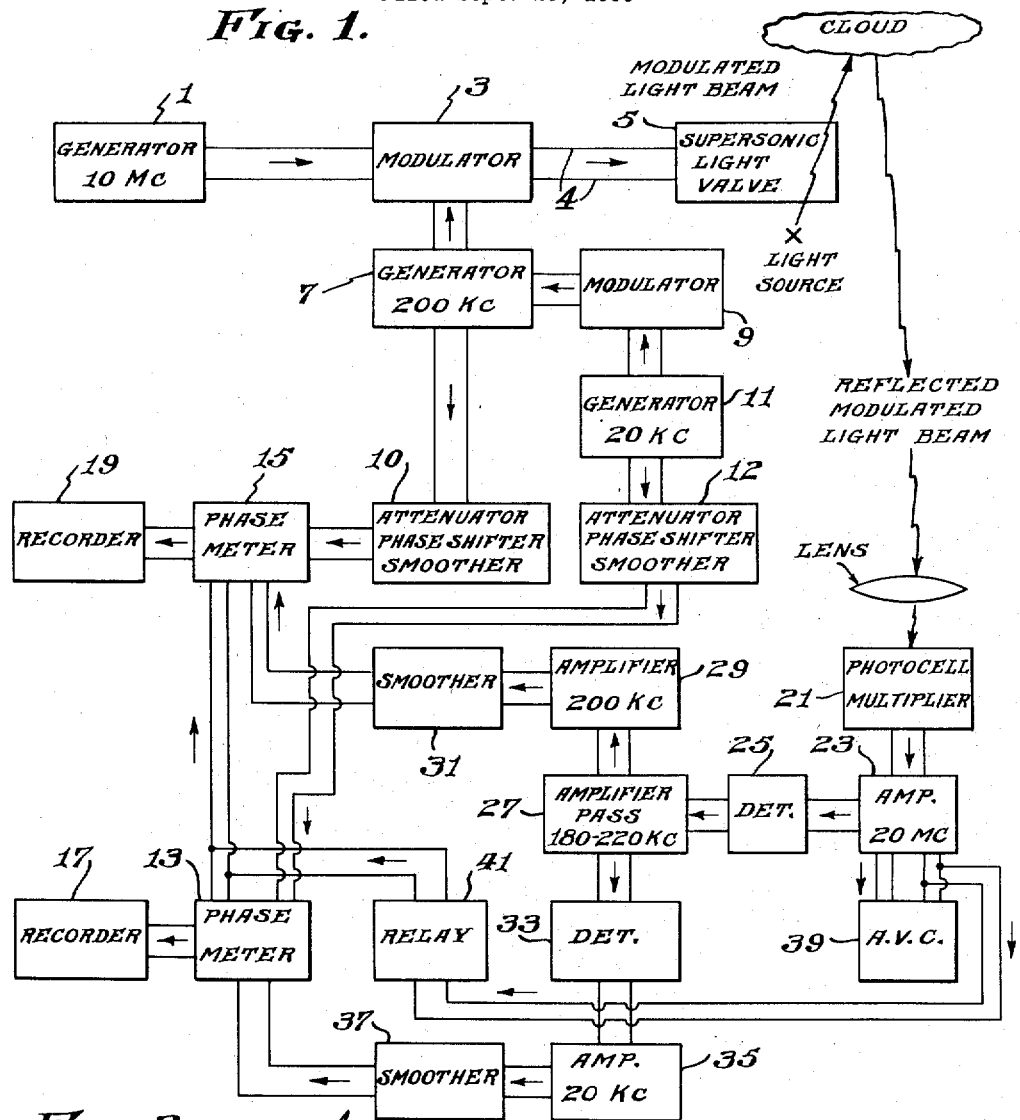
Figure 2:
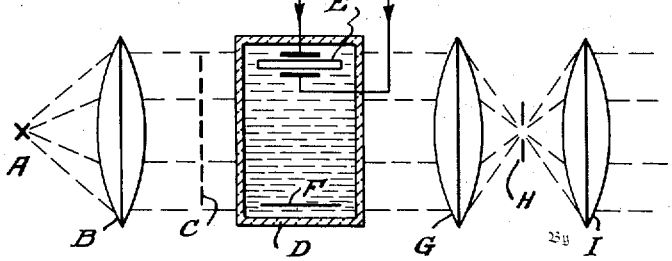

The invention will be described by referring to the accompanying drawing in which Figure 1 is a block diagram of the system; and Figure 2 is an elevational view of one embodiment of supersonic light valve employed in the invention.

Referring to Fig. 1, a carrier frequency generator 1 is connected through a modulator 3, and leads 4, to a supersonic light valve 5, which will be described hereinafter. The modulator 3 is connected to a second generator 7 which is, in turn, connected through a second modulator 9 to a third generator 11. The outputs of the second and third generators are connected, respectively, through attenuator, phase shifter and smoother circuits 10, 12 to main 13 and vernier 15 phase meters. The phase meters 13, 15 may include recorders 17, 19.

The receiver includes a photoelectric cell which is preferably connected as a photocell multiplier 21. The multiplier is connected to an amplifier 23 tuned to resonate at twice the original carrier frequency which is doubled by the operation of the light modulator. The output circuit of the amplifier is connected to a detector 25 which is suitably coupled to a band pass amplifier 27 arranged to pass the detected currents of the frequency band covered by the second and third or superimposed modulation frequencies. The band pass amplifier output circuit is connected as follows: First, through an amplifier 29 and smoother circuit 31 to the vernier phase meter 15; and, second, through a second detector 33, an amplifier 35 and smoother circuit 37 to the main phase meter 13. The carrier frequency amplifier 23 includes an automatic volume control network 39. The input of the AVC circuit is connected to the 20 megacycle amplifier 23. The output of the AVC circuit is connected to a relay 41 which is connected to the phase meters 13, 15.

A suitable light source A, such as a high pressure linear mercury arc, is applied, directly or from behind a slit, through a lens B upon a supersonic light valve D. The light valve consists of a transparent liquid in a transparent tank with a piezo-electric crystal E at one end. At the other end is either a reflecting or absorbing substance F, depending on which of the two modes of operation to be described below will be used. It is obvious that when a reflector is placed in the tank, a standing wave system will be set up if the crystal is actuated, whereas a travelling wave system will be set up if an absorber is used.

The operation with the standing wave system will first be described. It is well known that when a high frequency such as 10 mc. is applied to the crystal a kind of diffraction grating is set up and lines will appear when the light is concentrated by means of a lens G. By stopping out either the zero order or higher order lines, light is increased or decreased, respectively, when more signal is impressed on the crystal. For a standing wave, the liquid light modulation of twice the frequency impressed on the crystal results; in the case of the travelling wave, substantially no modulation results. If the tank is an inch or so long, and a 200 kc. modulation, for instance, is placed on the 10 mc. carrier, little change would normally result, since the 200 kc. wave length is so short that averaging would take place over the length of the cell. By placing a grating C in front of the tank, however, with a grating transmit and reject spacing of one-half wave length in the liquid, the 200 kc. modulation will be impressed on the light. If the crystal is well matched in impedance to the liquid, little reflection will take place at the transmitting end. All modulation frequencies with wave lengths longer than four times the cell length approximately will, therefore, be effective without a grating.

In the event that the carrier of 10 mc. is modulated with a 200 kc. signal, which, in turn, is modulated with 20 kc., a similarly modulated 20 mc. light wave will result. This light is formed with a beam by means of the lens 1 and projected toward the ceiling. The double modulation is used so that there will be no ambiguity and difficulty in reading the ceiling to within 50 feet at a height of 10,000 feet.

If the light cell is operated with an absorbing material F, there will be very little light modulation at the carrier frequency and the effective modulation will be at the two modulation frequencies, for example, 200 kc. and 20 kc. In this case the light cell may be made twice as long as indicated above. Furthermore, the carrier frequency amplifier 23 and first detector 25 may be omitted from the receiver.

The method of operation of the system is essentially as follows: The light, which is doubly modulated as described is projected toward the clouds. The modulated light beam, after reflection, is received by the photoelectric cell. The carrier frequency of the received light is doubled in the photoelectric cell. The modulated carrier currents are amplified, and demodulated to derive the currents corresponding to the original high and low frequency modulation currents. The higher frequency, for example, 200 kc., currents are amplified (by the 200 kc. amplifier 29) and filtered or smoothed (by the filter or smoother 31) to remove harmonics. The filtered currents from the smoother 31 and from the generator 7 and smoother 10 are applied to the phase meter 15 which compares the phase of the outgoing modulation with the received or incoming modulation and operates the vernier phase meter. The lower frequency, for example, 20 kc., currents are derived by demodulating the currents in the detector 33, are amplified in the amplifier 35, are smoothed or filtered by the smoother 37, and are applied to the main phase meter 13. The main phase meter compares the phase shift of the outgoing low frequency modulation currents with the incoming low frequency modulation currents by applying the currents from the 20 kc. generator 11 and filter 12 and the currents from the 20 kc. amplifier 35 and the filter 37 to the phase meter 13. The phase shift, main and vernier, are a function of the distance travelled by the light waves.

Since the higher modulation frequency is ten times the lower, the vernier indicator will measure ten times the phase displacement shown by the main indicator. It should be understood that the phase meters, instead of being calibrated in degrees, are preferably calibrated in units of length. The range of the instrument or system is limited by the constants, power output, and sensitivity of the receiver. It is preferable that the receiver be shielded from direct radiation of the transmitter. It also is preferable to provide some definite indication of a ceiling of unlimited height. This is accomplished by the automatic volume control and relay connected thereto. In the absence of the received modulated light, the AVC permits the maximum flow of anode current in the amplifier 23, as is well known to those skilled in the art. The maximum anode current is applied to the relay which is thus closed. The relay controls a current source (not shown) which is arranged to apply a positive indication to the phase meters when no reflected modulated light waves, which is the condition for unlimited ceiling, are being received. It should be understood that unmodulated light will not apply a signal to the receiver, and hence the ordinary light at the point of reception will not affect the phase meters.

Inasmuch as the generators, modulators, attenuators, phase shifters, filters or smoothers, detectors, automatic volume control amplifiers, phase meters and recorders are well known to those skilled in the art, no detailed description is necessary. With respect to the photoelectric cell and multiplier, reference is made to United States Patent No. 2,005,059, issued June 18, 1935, to Tedham, entitled "Light sensitive apparatus." While one form of supersonic light valve is described herein, and certain frequencies have been indicated, it should be understood that the invention is not limited in this respect, as the method may be practiced by various types of generators, amplifiers, modulators and the like operated at other than the suggested frequencies. While the supersonic light valve has been described as including a liquid, for example carbon tetrachloride, it should be understood that other liquids or even solids may be used.

I claim as my invention:

1. A distance measuring device including, in combination, a light source, means for propagating light from said source toward a light reflecting object whose distance is to be measured, means coupled to said light source for modulating the outgoing light, a receiver for receiving modulated light reflected from said object, a phase meter for indicating said distance as a function of the relative phases of the outgoing and incoming modulated light, and means effectively connecting said phase meter to said receiver and to said modulating means.

2. A distance measuring device including, in combination, a light source, means for directing light from said source toward a light reflecting object whose distance is to be measured, means coupled to said light source for modulating the outgoing light at a supersonic rate, a receiver for receiving modulated light reflected from said object, a phase meter for indicating said distance as a function of the relative phases of the outgoing and incoming modulated light, and means effectively connecting said phase meter to said receiver and to said modulating means.

3. A distance measuring device including, in combination, a light source, means for directing light from said source toward a light reflecting object whose distance is to be measured, means coupled to said light source for modulating the outgoing light with a supersonic carrier frequency and a modulation frequency, a receiver for receiving modulated light reflected from said object, a phase meter for indicating said distance as a function of the relative phases of the outgoing and incoming modulated light, and means effectively connecting said phase meter to said receiver and to said modulated means.

4. A distance measuring device including, in combination, a light source, means for directing light from said source toward a light reflecting object whose distance is to be measured, a light valve effectively connected to a main modulator and a vernier modulator for applying a main and a vernier modulation frequency to the outgoing light, a receiver for receiving and demodulating the modulated light reflected from said light, phase meters for indicating said distance as a function of the relative phases of the outgoing and incoming main and vernier modulation frequencies, means effectively connecting said phase meters with said receiver, and means effectively connecting one of said phase meters to said main modulator and the other of said phase meters to said vernier modulator.

5. A distance measuring device including, in combination, a light source, means for directing light from said source toward a light reflecting object whose distance is to be measured, a light valve effectively connected to a main modulator and a vernier modulator for applying to the outgoing light main and vernier modulation signals bearing a one to ten frequency ratio, a receiver for receiving and demodulating the modulated light reflected from said light, phase meters for indicating said distance as a function of the relative phases of the outgoing and incoming main and vernier modulation frequencies, means effectively connecting said phase meters with said receiver, and means effectively connecting one of said phase meters to said main modulator and the other of said phase meters to said vernier modulator.

6. In a device of the character of claim 1, means for indicating the absence of reception of reflected modulated light at said receiver.

7. In a device of the character of claim 3, means for indicating the absence of reception of reflected modulated light at said receiver.

8. A distance measuring device including, in combination, a light source, means for directing light from said source toward a light reflecting object whose distance is to be measured, a light valve coupled to said light source for applying a main and a vernier modulation frequency to the outgoing light, a receiver for receiving and demodulating the modulated light reflected from said object, and means connected to said receiver for indicating the absence of reception of reflected modulated light.

9. The method of indicating the distance of a light reflecting object which includes radiating light toward said object, modulating said light, receiving the modulated light after reflection from said object, and indicating said distance as a function of the phase of the outgoing and incoming modulated light.

10. The method of indicating the distance of a light reflecting object which includes radiating a light beam toward said object, modulating said light beam, receiving the modulated light beam after reflection from said object, and indicating said distance as a function of the phase of the outgoing and incoming modulated light beam.

11. The method of measuring the distance of a light reflecting substance which includes forming a light beam, modulating said beam at a supersonic rate, radiating said modulated beam toward said substance, receiving said modulated beam after reflection from said object, demodulating said beam, and indicating said distance as a function of the relative phases of said first and last mentioned modulation.

12. The method of measuring the distance of a light reflecting substance which includes establishing a light beam, modulating said light beam with signals of main and vernier frequencies, radiating said modulated beam toward said substance, receiving said modulated beam after reflection from said substance, demodulating said beam, and comparing the phase of the outgoing and incoming main signal and the phase of the outgoing and incoming vernier signal to thereby measure said distance.

13. The method of measuring the distance of a light reflecting substance which includes establishing a light beam, modulating said light beam with signals of carrier main and vernier frequencies, radiating said modulated beam toward said substance, receiving said modulated beam after reflection from said substance, demodulating said beam, and comparing the phase of the outgoing and incoming main signal and the phase of the outgoing and incoming vernier signal to thereby measure said distance.

14. The method characterized by claim 9, including the step of indicating the absence of received reflected modulated light.

15. The method characterized by claim 12, including the step of indicating the absence of received reflected modulated light.

16. A distance measuring device including, in combination, a light source, a modulator connected to said light source for varying said light, means for propagating said modulated light toward a reflecting object whose distance is to be measured, means for receiving modulated light reflected from said object, means effectively connected to said modulator and to said receiving means for indicating said distance as a function of the outgoing and incoming light, and means connected to said receiver for indicating the absence of said incoming light.

17. A distance measuring device including, in combination, a light source, a modulator effectively connected to said light source for varying said light, means for propagating said modulated light toward a reflecting object whose distance is to be measured, means for receiving modulated light reflected from said object, means effectively connected to said modulator and to said receiving means for indicating said distance as a function of the outgoing and incoming light, and means effectively connected to said receiver for indicating the absence of said reflecting object.

18. A distance measuring device including a light source and a modulator for said light including a grating and a supersonic light valve.

19. A distance measuring device including a light source and a modulator for modulating said light including a supersonic light valve and a grating having transmit and reject spacing substantially equal to one-half wavelength of said modulation frequency in said light valve.

IRVING WOLFF.